(12) United States Patent
Fountain et al.

(10) Patent No.: US 12,547,173 B2
(45) Date of Patent: Feb. 10, 2026

(54) SYSTEM AND METHOD FOR COORDINATING MOBILE ROBOTS WITH WORKERS TO ACCESS TASK LOCATIONS

(71) Applicant: ZEBRA TECHNOLOGIES CORPORATION, Lincolnshire, IL (US)

(72) Inventors: Mark Thomas Fountain, Hitchin (GB); Brian Califano, Point Pleasant, NJ (US); Noel Steven Massey, Carpentersville, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 283 days.

(21) Appl. No.: 18/115,135

(22) Filed: Feb. 28, 2023

(65) Prior Publication Data
US 2024/0288867 A1   Aug. 29, 2024

(51) Int. Cl.
*G05D 1/00* (2024.01)
(52) U.S. Cl.
CPC .................. *G05D 1/0212* (2013.01)
(58) Field of Classification Search
CPC ........... G05D 1/0212; G05D 1/02; G06F 1/16

USPC .......................................................... 701/26
See application file for complete search history.

(56) References Cited

U.S. PATENT DOCUMENTS

| 9,829,333 | B1 * | 11/2017 | Calder .................. | G06Q 10/08 |
| 2019/0243358 | A1 * | 8/2019 | Jaquez ................. | G05D 1/0282 |
| 2020/0031578 | A1 * | 1/2020 | Lisso ................... | B65G 1/1375 |

OTHER PUBLICATIONS

International Search Report and Written Opinion for International Application No. PCT/US2024/16678 mailed on Jun. 14, 2024.

* cited by examiner

*Primary Examiner* — Yazan A Soofi

(57) ABSTRACT

An example method of coordinating a mobile robot with a worker to access a task location of a task includes: obtaining the task location of the task for the mobile robot; defining a restricted region about the task location, the restricted region defining a region in which the mobile robot is restricted from stopping; identifying a worker access zone of the restricted region, the worker access zone for the worker to enter the restricted region to access the task location; determining a stop pose for the mobile robot, wherein the stop pose includes a stop position outside the restricted region and selected to avoid obstructing the worker access zone; and directing the mobile robot to the stop pose for completion of the task.

25 Claims, 10 Drawing Sheets

SYSTEM AND METHOD FOR COORDINATING MOBILE ROBOTS WITH WORKERS TO ACCESS TASK LOCATIONS

BACKGROUND

Facilities such as warehouses, manufacturing facilities, healthcare facilities, or the like may employ autonomous or semi-autonomous mobile robots to transport items within the facility. Movement of the items to and from shelves may be facilitated by workers in the facility. Upon arrival to the task location, the robot may physically interfere with worker's access to the task location, increasing the time required to perform each task and/or causing time and energy-consuming navigational re-adjustments.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
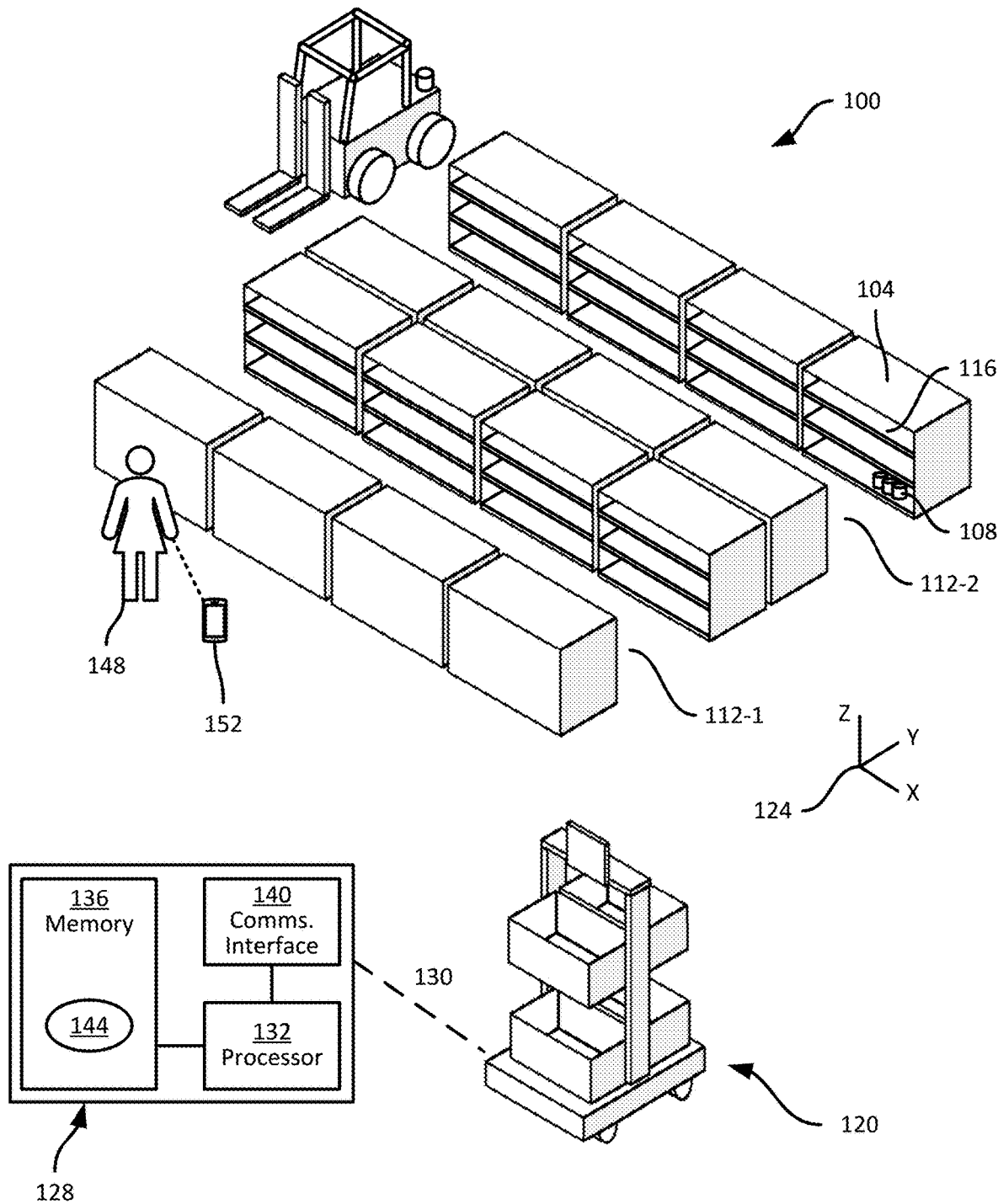
FIG. 1 is a schematic diagram of an example system for coordinating a mobile robot with a worker to access a task location.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: obtaining the location of the task: identifying a restricted region about the task location, the restricted region representing an area in which the mobile robot is restricted from stopping: identifying a worker access zone relative to the restricted region for the worker to access the location: and determining a stop pose of the mobile robot, wherein the stop pose includes a stop position and orientation outside of the restricted region selected to avoid obstructing the worker access zone.

Additional examples disclosed herein are directed to a server comprising: a memory and a communications interface: a processor interconnected with the memory and the communications interface, the processor configured to: obtain the task location of the task for the mobile robot: define a restricted region about the task location, the restricted region defining a region in which the mobile robot is restricted from stopping: identify a worker access zone of the restricted region, the worker access zone for the worker to enter the restricted region to access the task location: determine a stop pose for the mobile robot, wherein the stop pose includes a stop position and orientation outside of the restricted region and selected to avoid obstructing the worker access zone: and direct the mobile robot to the stop pose for completion of the task.

Additional examples disclosed herein are directed to a mobile robot comprising: a chassis with a locomotive assembly: a processor configured to: obtain a location of a task: identify a restricted region around the task location, the restricted region representing an area in which the mobile robot is restricted from stopping: identify a worker access zone of relative to the restricted region for the worker to access the task location: and determine a stop pose of the mobile robot, wherein the stop pose includes a stop position outside the restricted region selected to avoid obstructing the worker access zone.

FIG. 1 illustrates a system 100 deployed in an interior of a facility, such as a warehouse, a manufacturing facility, a healthcare facility, or the like. The facility includes a plurality of support structures 104 carrying items 108. In the illustrated example, the support structures 104 include shelf modules, e.g., arranged in sets forming aisles 112-1 and 112-2 (collectively referred to as aisles 112, and generically referred to as an aisle 112: similar nomenclature is used herein for other components). As shown in FIG. 1, support structures 104 in the form of shelf modules include support surfaces 116 supporting the items 108. The support structures 104 can also include pegboards, bins, or the like, in other examples.

In other examples, the facility can include fewer aisles 112 than shown, or more aisles 112 than shown in FIG. 1. The aisles 112, in the illustrated example, are formed by sets of eight support structures 104 (four on each side). The facility can also have a wide variety of other aisle layouts, however. As will be apparent, each aisle 112 is a space open at the ends and bounded on either side by a support structure 104. The aisle 112 can be travelled by humans, vehicles, and the like. In still further examples, the facility need not include aisles 112, and can instead include assembly lines or the like.

The items 108 may be handled according to a wide variety of processes, depending on the nature of the facility. In some examples, the facility is a shipping facility, distribution facility, or the like, and the items 108 can be placed on the support structures 104 for storage, and subsequently retrieved for shipping from the facility.

Placement and/or retrieval of the items 108 to and/or from the support structures can be performed by a mobile robot 120 and a worker 148 via assignment of tasks by a coordinating server 128. While only one robot 120 and one worker 148 are illustrated in the present example, more robots 120 and workers 148 may be deployed in the facility, depending on the size and/or layout of the facility, the nature of the items 108, and the like.

Each task can include either or both of one or more locations to travel to, and one or more actions to perform at those locations. The tasks may include tasks to pick items from support structures to the robot 120, to move items from the robot 120 to the support structures, or non-item related tasks for the robot 120 to assist a worker 148 (e.g., for the robot to act as a step ladder or the like). For example, the server 128 can assign a pick task to the robot 120 to travel to a pick location within the facility, and to await the receipt of one or more items 108 at the pick location. A corresponding pick task may also be assigned to a worker 148 to navigate to the pick location and retrieve one or more of the items 108 from the support structure 104 at the pick location and to deposit the items 108 into or onto the robot 120.

Tasks may be assigned to the worker 148 via a mobile computing device 152. The device 152 may be a tablet computer, a smart phone, a wearable computer (e.g., smart glasses), a barcode scanner, or the like. The device 152 can implement functionality to assist the worker 148 in completing various tasks in the facility, such as by providing instructions to perform a pick task.

To improve and optimize task assignment between multiple workers 148 and robots 120 within the facility, the server 128 may be configured to track the locations of the robots 120 and the workers 148 (e.g., using the locations of the devices 152 as a proxy) within a coordinate system 124 of the facility. Accordingly, the facility may include a location tracking subsystem which may include, for example, wireless emitters deployed throughout the facility, such as wireless network access points, beacons (e.g., Bluetooth beacons), radio frequency identification (RFID) readers, and the like. In other examples, the location tracking subsystem can include cameras or other sensors configured to detect the device 152 and/or the robot 120, e.g., from video streams captured by the cameras. The device 152 and the robot 120 can be configured to determine their locations in the coordinate system 124 based on the signal strength measurements and/or other parameters determined from signals generated by the emitters. The device 152 and the robot 120 can then report the determined locations to the server 128. In other examples, the emitters can cooperate to determine and report the locations of the robot 120 and/or the device 152 to the server 128 (e.g., in the case of emitters that include RFID readers). In further examples, the device 152 and/or the robot 120 can include motion sensors, such as inertial measurement units (IMUs), odometers (in the case of the robot 120), Light Detection and Ranging (LIDAR) sensors, or the like to assist in determining and reporting locations.

Each robot 120 can be configured to track its pose (e.g., location/position and orientation) within the facility, e.g., in the coordinate system 124 previously established in the facility. The robot 120 can navigate autonomously within the facility, e.g., travelling to pick locations assigned to the robot 120 to receive and/or deposit items 108. To execute tasks assigned to the robot 120 by the server 128, the mobile robot 120 can be configured to capture and process sensor data, e.g., to detect obstacles in the facility such as the support structures 104, the human worker 148, or the like. The robot 120 can alter navigational behavior in response to detection of such obstacles, e.g., by altering the route taken by the robot 120, stopping travel along a route to allow passage of the worker 148, or the like.

Tasks can be assigned to the robot 120 and the worker 148 via the device 152 by the exchange of messages between the server 128 and the robots 120 and/or devices 152, e.g., over a link 130 defined by a suitable combination of local and wide-area networks. The server 128 can be deployed at the facility and communicate with the robot 120 via one or more local networks, e.g., wireless local area networks (WLANs) deployed within the facility. In other examples, the server 128 is located remotely from the facility, and can communicate with the robot 120 and the devices 152 via a combination of local and wide area networks. In some examples, the server 128 is configured to assign tasks to robots 120 and devices 152 at multiple facilities.

The server 128 includes a processor 132, such as one or more central processing units (CPU), graphics processing units (GPU), or dedicated hardware controllers such as application-specific integrated circuits (ASICs). The processor 132 is communicatively coupled with a non-transitory computer readable medium such as a memory 136, e.g., a suitable combination of volatile and non-volatile memory elements. The processor 132 is also coupled with a communications interface 140, such as a wireless transceiver enabling the robot 120 to communicate with other computing devices, such as the mobile robots 120. The memory 136 can store a plurality of computer-readable instructions executable by the processor 132, such as a task and path assignment application 144 whose execution by the processor 132 configures the processor 132 to assign tasks and robot paths to navigate to each task location for the mobile robot 120.

In operation, when the robot 120 is assigned to a task at a task location, the robot 120 may traditionally navigate to a stop position in the aisle 112 immediately in front of the task location. However, such a stop position may block or obstruct the worker 148 from the task location, including, for example from picking the item 108 from the support structure 104 to be deposited onto the robot 120. This may increase the amount of time required to accomplish the task and require the robot 120 to spend additional time at each task location.

In other examples, when the worker 148 arrives at the task location prior to the robot 120, the robot 120 may detect the worker 148 as an obstacle and may alter its path to attempt to arrive at the designated stop location. However, since the worker 148 may obstruct the stop location, the robot 120 may not be able to find a suitable path and may continually attempt to recalculate its path. This may result in redundant and unnecessary path recalculations by the robot 120 while additionally increasing the difficulty for the worker 148 to deposit the item 108 onto the continually moving robot 120.

Accordingly, in accordance with the present disclosure, for each task and task location, the server 128 may additionally assign a stop pose associated with the task. The stop pose may include a stop position located outside a restricted region about the task location. That is, the restricted region may be defined by a region within the aisle 112 about the task location in which the robot 120 is restricted from stopping. The restricted region may be dynamically selected based on the task, size of the item 108, size of the aisle 112, or the like to allow the worker 148 to easily accomplish the task. For example, the size of the restricted region may be selected based on physical characteristics (e.g., height and/or arm-span, handedness, use of mobility aids, etc.) of the worker 148.

Figure 2:
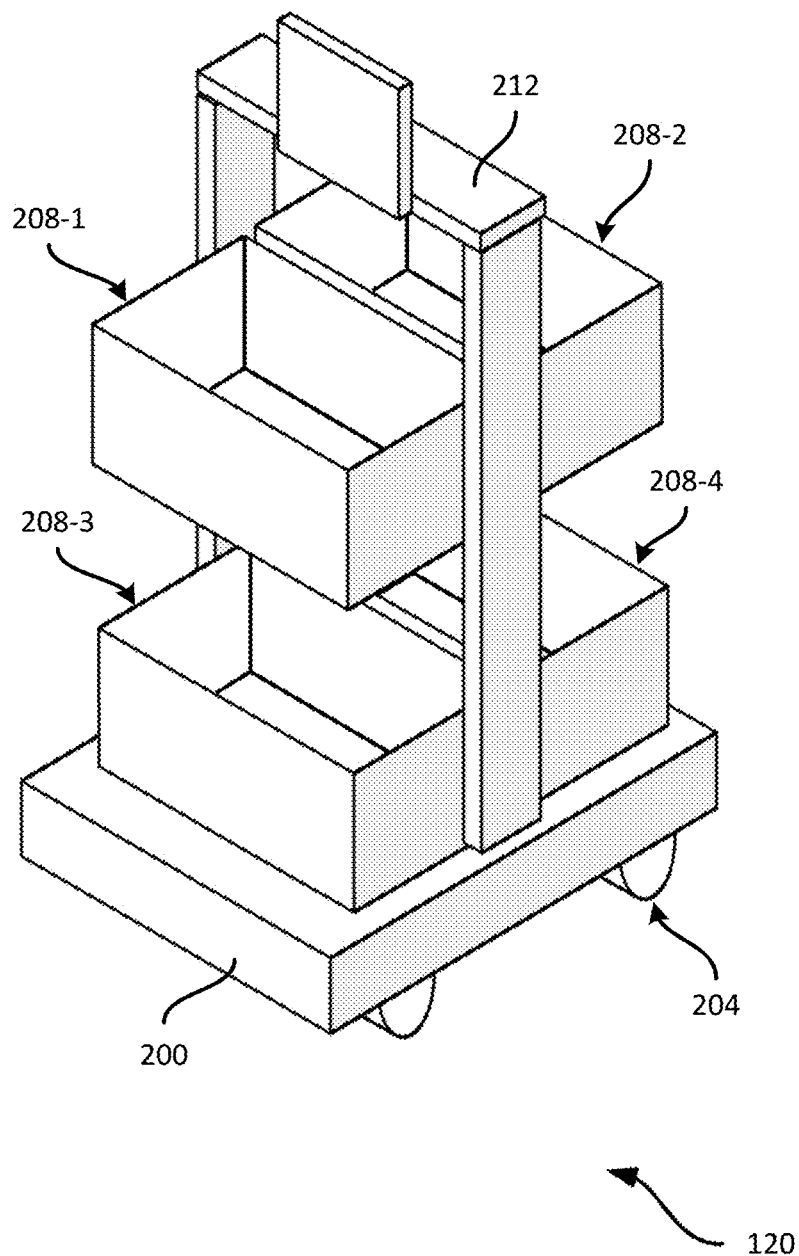
FIG. 2 is a schematic diagram of the mobile robot of FIG. 1.

In some examples, the stop pose may additionally include a stop orientation to orient a target item basket on the robot 120 proximal to the worker and/or task location. In particular, for example, referring to FIG. 2, the robot 120, according to an example implementation, is illustrated in greater detail. The robot 120 includes a chassis 200 with a locomotive assembly 204, such as wheels, tracks, or the like driven by an electric motor. The chassis 200 supports at least one target item basket 208: in the present example, four target item baskets 208-1, 208-2, 208-3, and 208-4 are depicted. Each target item basket 208 is to collect items 108 for a given order. The target item baskets 208 may be organized on the chassis 200 such that two of the baskets 208-1 and 208-3 extend from a central portion 212 of the chassis 200 on a first side, while the other two baskets 208-2 and 208-4 extend from the central portion 212 on a second side opposite the first side. That is, the central portion 212 may obstruct a worker 148 on the first side from accessing the baskets 208-2 and 208-4 on the second side, and vice versa. The stop orientation assigned to the robot 120 in the stop pose may therefore allow the worker 148 to access the appropriate basket 208 for the task.

In addition to the stop pose, the server 128 may additionally determine a robot path for the robot 120 to navigate to the task location, and in particular, to the stop position. The robot path may be determined based on the worker path, and in particular to avoid interference with the worker path. That is, if a candidate robot path and the worker path are planned such that the robot 120 and the worker 148 are expected to be in the same location (or within a threshold distance from one another) at the same time (or within a threshold time period), then the candidate robot path may be discarded, and a new robot path may be charted, for example to traverse a different aisle 112, to move along a different side of the aisle 112, or similar.

The stop pose and the robot path of the robot 120 may be determined by the server 128 to reduce the number of navigational adjustments by the robot 120 and to prioritize space during navigation and during the task (i.e., at the task location) for the worker 148 to optimize the time required for the worker 148 to perform the task with the assistance of the robot 120. The stop pose is additionally preferably determined in real-time, for example in response to initiating each task assigned to the robot 120. This may allow the server 128 to consider current locations of workers 148, their worker paths and the like.

In other examples, the stop pose may be determined by the robot 120 itself, by a mesh network including the robot 120, with communication to the device 152 and/or the coordinating server 128, or other suitable computing resources.

Figure 3:
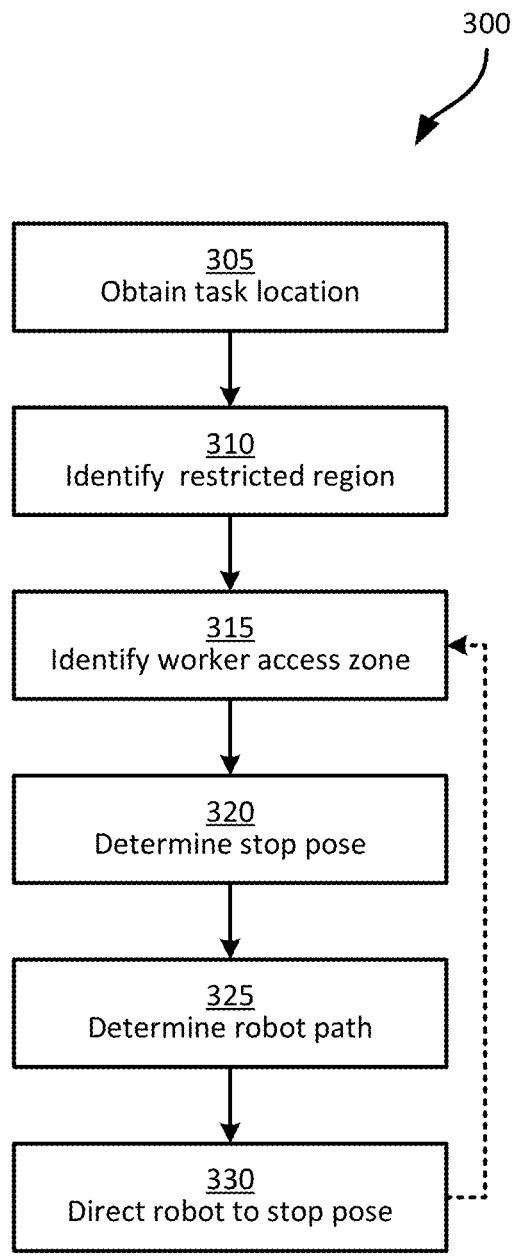
FIG. 3 is a flowchart of an example method for coordinating a mobile robot with a worker to access a task location.

Turning now to FIG. 3, the functionality implemented by the server 128 will be discussed in greater detail. FIG. 3 illustrates a method 300 of coordinating a mobile robot with a worker to allow the robot to access a task location of a task. The method 300 will be discussed in conjunction with its performance in the system 100, and particularly by the server 128, via execution of the application 144. In other examples, some or all the method 300 may be performed by other suitable devices or systems, such as the robot 120, a distributed system such as a mesh network formed from a plurality of the robots 120, or the like.

The method 300 is initiated at block 305, for example in response to the robot 120 preparing to perform a task assigned to the robot 120. For example, the robot 120 may provide an indication to the server 128 that it is preparing for the task. The indication may include, for example, a request for a robot path to navigate to the task location. Accordingly, at block 305, the server 128 obtains the task location for the task. The task location may be retrieved, for example, from a task and/or item repository stored in the memory 136, from another server, or the like. The task location may be defined, for example, by an aisle 112 in which the relevant item 108 is located, a particular support structure 104, and a particular support surface 116 on which the relevant item 108 is located. In other examples, the task location may be defined within the coordinate system 124 of the facility, combinations of the above, and the like.

At block 310, the server 128 defines a restricted region about the task location. In particular, the restricted region defines a region in which the mobile robot 120 is restricted from stopping. That is, the stop position of the robot 120 may not be permitted to be within the restricted region.

Figure 4:
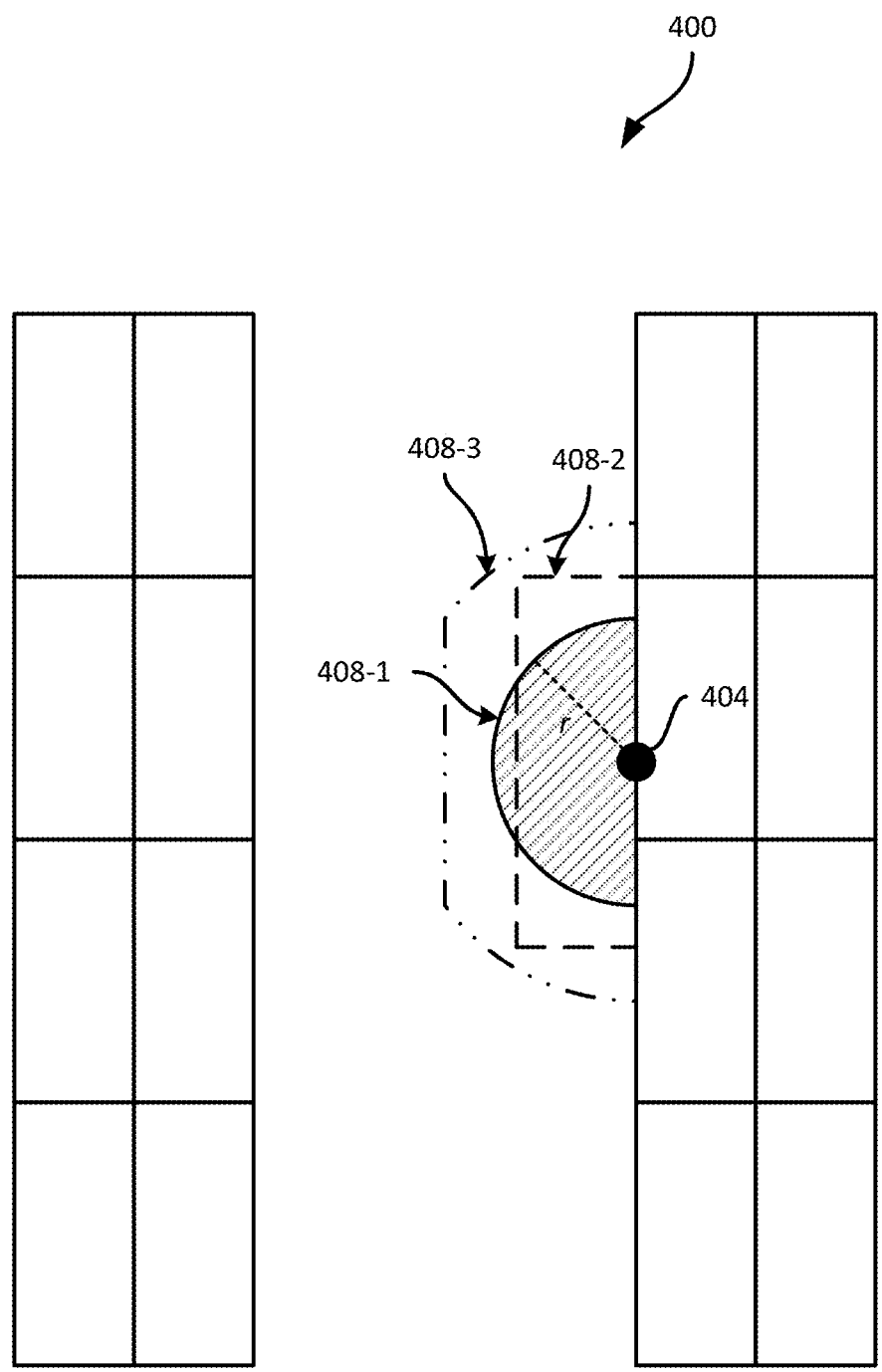
FIG. 4 is a schematic diagram of an example performance of block 310 of the method of FIG. 3.

For example, referring to FIG. 4, a schematic diagram of a portion of a map 400 of the facility is depicted. The map 400 identifies a task location 404 of a task of the mobile robot 120. In particular, the task location 404 may represent the location on a support structure 104 of an item 108 to be retrieved or picked. The map 400 further depicts a restricted region 408 about the task location 404. The restricted region 408-1, in the present example, is defined by the area of a circle with radius r about the task location 404 which overlaps portions of the facility which are traversable by the robot 120. That is, since the robot may not traverse the support structure 104, the restricted region 408-1 may be limited to a semi-circle located within the aisle 112. In other examples, other restricted region 408 may have other shapes and/or sizes (e.g., rectangular, elliptical, custom shapes as defined by the worker or a manager of the facility, etc.). For example, FIG. 4 depicts restricted regions 408-2 and 408-3 having a rectangular and a custom-defined shape, respectively.

In some examples, the server 128 may dynamically select the size of the restricted region 408 (e.g., as defined by the radius r in the case of restricted region 408-1) based on the size and/or shape of the item 108, the size of the aisle 112 of the task location 404, or other parameters. For example, the radius r may be selected to be at least one half of a maximum dimension of the item 108, such that the restricted region 408 may accommodate the maximum dimension of the item 108. In other examples, the restricted region 408 may be defined to reserve at least a threshold amount of space within the aisle 112 (e.g., half the width of the aisle 112, 3 feet of space or some other fixed amount of space, etc.) for other workers 148 and/or robots 120 to traverse the aisle 112. The server 128 may consider combinations of the size and/or shape of the item 108 and a size the aisle 112 in defining the restricted region 408. For example, the restricted region 408-2 may have a length (i.e., as defined longitudinally along the aisle 112) of at least the maximum dimension of the item 108, and a width (i.e., as defined transverse to the aisle 112) of at most one half the width of the aisle 112. Similarly, the restricted region 408-3 may be a custom-defined region, or may be a semi-circle of radius about the task location with a minor segment (e.g., which extends past half the width of the aisle) discarded. Other shapes and/or sizes of the restricted region 408 are also contemplated.

Returning to FIG. 3, at block 315, the server 128 identifies a worker access zone of the restricted region. The worker access zone is a portion (e.g., an edge, a subregion, or similar) relative to the restricted region in which the worker 148 is predicted to access the item 108 at the task location. Accordingly, the worker access zone may inform the selection of the stop pose for the robot 120 to reduce the likelihood of the robot 120 and the worker 148 obstructing one another, thereby causing increased time to complete the task and/or increased navigational adjustments by the robot 120.

Accordingly, at block 320, the server 128 determines the stop pose for robot based on the worker access zone identified at block 315. In particular, the stop pose includes a stop position outside the restricted region. Further, the stop pose is selected to avoid obstructing the worker access zone identified at block 315.

Figure 5:
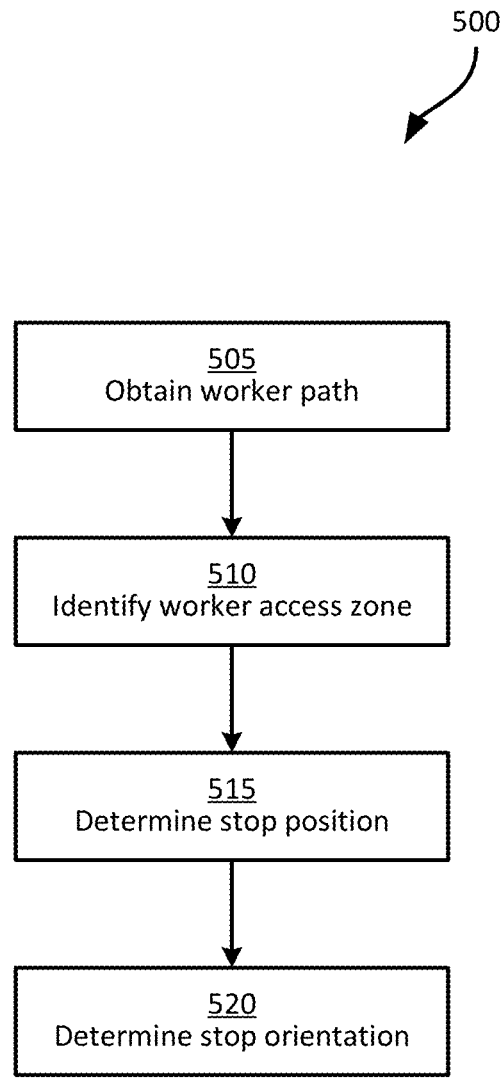
FIG. 5 is a flowchart of an example method for identifying the worker access zone and determining the stop pose at blocks 315 and 320 of the method of FIG. 3.

For example, referring to FIG. 5, a flowchart of a method 500 of identifying the worker access zone and selecting the stop pose at blocks 315 and 320 is depicted.

At block 505, the server 128 obtains a worker path of the worker 148 assigned to the same task as the robot 120. The worker path may be a suggested (i.e., by the server 128 to the worker 148 via the device 152) or predicted path of the worker 148 to navigate to the task location, based for example on a current location of the worker 148 within the facility.

At block 510, the server 128 identifies the worker access zone based on the worker path. For example, the worker access zone may be defined at a proximal side of the task location relative to the worker path. That is, the worker access zone may be upstream of the task location with respect to the worker path and navigation direction along the aisle 112 of the worker 148 to navigate to the task location. In some examples, the worker access zone may be defined as a subregion or portion of the restricted region, while in other examples, the worker access zone may be a portion of a perimeter of the restricted region.

Figure 6:
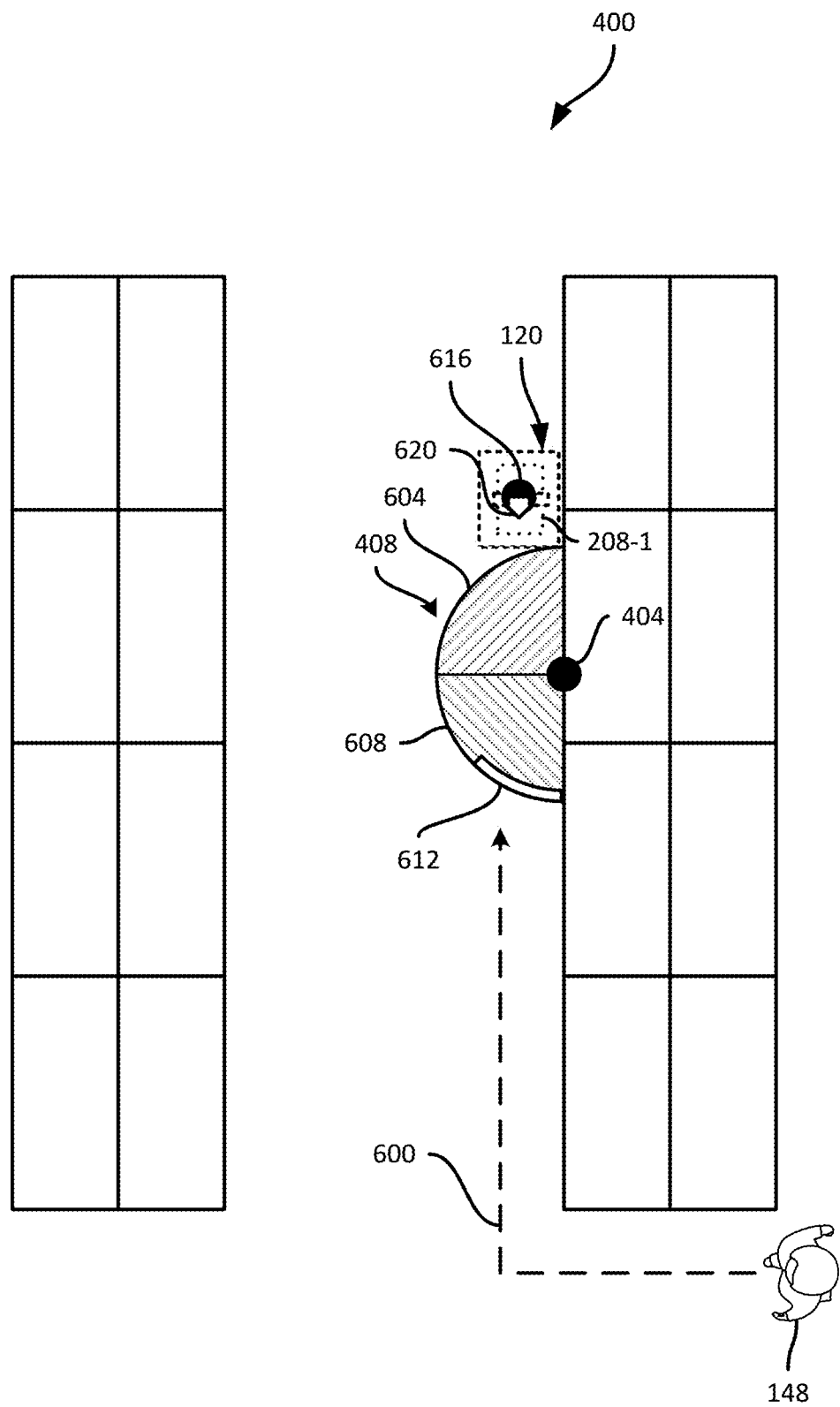
FIG. 6 is a schematic diagram of an example performance of the method of FIG. 5.

For example, referring to FIG. 6, another schematic diagram of the map 400 with the restricted region 408 is depicted. Further, the server 128 may identify a worker path 600 for the worker 148 to navigate to the task location 404.

Upon obtaining the worker path 600, the server 128 may identify a worker access zone. For example, the worker access zone may be a subregion 604 representing approximately half of the restricted region 408. In particular, the restricted region 408 may be approximately bisected at the task location 404 perpendicular to the longitudinal axis of the aisle 112. That is, the restricted region 408 may be divided into the subregion 604 which is upstream of the task location 404 with respect to the worker path 600, and another subregion 608 which is downstream of the task location 404 with respect to the worker path 600. The subregion 604 is proximal to or upstream with respect to the worker path 600, while the subregion 608 is distal from the worker path 600, and hence between the subregions 604 and 608, the subregion 604 is identified as the worker access zone.

In other examples, the worker access zone may be defined as a portion 612 of the perimeter of the restricted region 408. For example, the perimeter portion 612 may be defined based on average proportions of workers 148 and an average width for the worker 148 to enter the restricted region 408 and based on the portion of the perimeter which is closest to the worker path 600.

Returning to FIG. 5, at block 515, the server 128 determines a stop position for the robot 120. In particular, the stop position is a position which is outside the restricted region, and which avoids obstructing the worker access zone. Such a position may be, for example, a position at a second side of the task location distal from the worker path, or which is downstream from the task location with respect to the worker path and navigation direction along the aisle 112 of the worker 148 to navigate to the task location.

For example, with reference to the example illustrated in FIG. 6, the server 128 may select a position along the exterior perimeter of the subregion 608, since any position along the exterior perimeter of the subregion 604 may obstruct the subregion 604 as the worker access zone. Alternatively, the server 128 may select a position along the exterior perimeter of the restricted region 408 except for the perimeter portion 612 identified as the worker access zone.

In some examples, the server 128 may additionally consider other parameters and/or conditions when selecting the stop position. For example, the stop position for the robot 120 may be selected to be the closest position to the task location which satisfies the criteria. Further, preferably, the stop position may be along an edge of an aisle 112 to allow other robots 120 or workers 148 to pass the robot 120 while in the stop position.

At block 520, the server 128 determines a stop orientation for the robot 120. In particular, the robot 120 and/or the server 128 may first identify one or more receptacles of the robot 120 as being available for the task. For example, the receptacles may include one of the baskets 208, or portions of the chassis 200 (e.g., for large items 108 which do not fit in one of the baskets 208) into or onto which items 108 may be loaded or unloaded in conjunction with the task. The stop orientation may be selected to orient the one or more identified receptacles on the mobile robot 120 proximal to the task location or toward the worker access zone so that the one or more receptacles are accessible by the worker from the worker access zone.

For example, when the robot 120 includes target item baskets 208 which may be obstructed by portions of the robot 120 itself, such as the central portion 212, selecting the stop orientation of the robot 120 may further reduce the time to perform the task by providing access to the target item basket 208 by the worker 148. Thus, if the target item basket 208 is on the first side of the central portion 212, the stop orientation may be selected to orient the first side of the robot 120 proximal to the task location. The robot 120 may still be oriented substantially parallel to the length of the aisle 112, such that the first side of robot 120 faces one end of the aisle 112 while the second side of the robot 120 faces the other end of the aisle 112. In other examples, the stop orientation may include any angular orientation of the robot 120 to allow the target item basket 208 to be angled towards the task location.

For example, returning to FIG. 6, a stop position 616 and a stop orientation 620 for the robot 120 are also illustrated. In the present example, the stop position 616 is selected to be along the perimeter of the subregion 608 outside the restricted region 408 and adjacent to the support structure 104 of the task location 404 (i.e., adjacent the support structure 104 on which the relevant item 108 is located). More particularly, the stop position 616 is selected such that the entire robot 120 is located outside of the restricted region 408. That is, the stop position 616 which may generally represent a center of the robot 120, may be selected to be sufficiently far from the restricted region 408 to allow the robot 120 to stop substantially adjacent to the perimeter of the restricted region 408. In other examples, the stop position 616 itself may be along the perimeter of the restricted region 408 and the robot 120, once at the stop position 616 may partially obstruct the restricted region.

The stop orientation 620 is illustrated by an arrow, where the arrow represents a "forward" direction of the robot 120 (illustrated in dashed lines), or a direction in which to orient the first side of the robot 120. In other examples, other directional representations and definitions with respect to the robot 120 are also contemplated. In the present example, the stop orientation 620 orients the first side of the robot 120 towards the task location 404, such that the target item basket 208-1 (illustrated in dotted lines) is proximal to the task location 404.

Together, the stop position and the stop orientation define the stop pose of the robot 120, and accordingly, the server 128 may then return to the method 300 of FIG. 3. In particular, the server 128 may proceed to block 325. At block 325, the server 128 determines a robot path for the robot 120 to navigate to the stop pose. Preferably, the robot path may be defined to avoid interference with the worker path for the worker 148 to navigate to the task location while optimizing the distance travelled by the robot 120. The robot path may be determined to avoid interference with the worker path if, for example: (i) no portion of the robot path overlaps with the worker path: (ii) the estimated time of arrival of the worker 148 is after a threshold buffer time after the estimated time of arrival of the robot 120, (iii) time-sequenced regions of the robot path and the worker path do not overlap with one another, or other suitable manners of determining a lack of interference.

Figure 7:
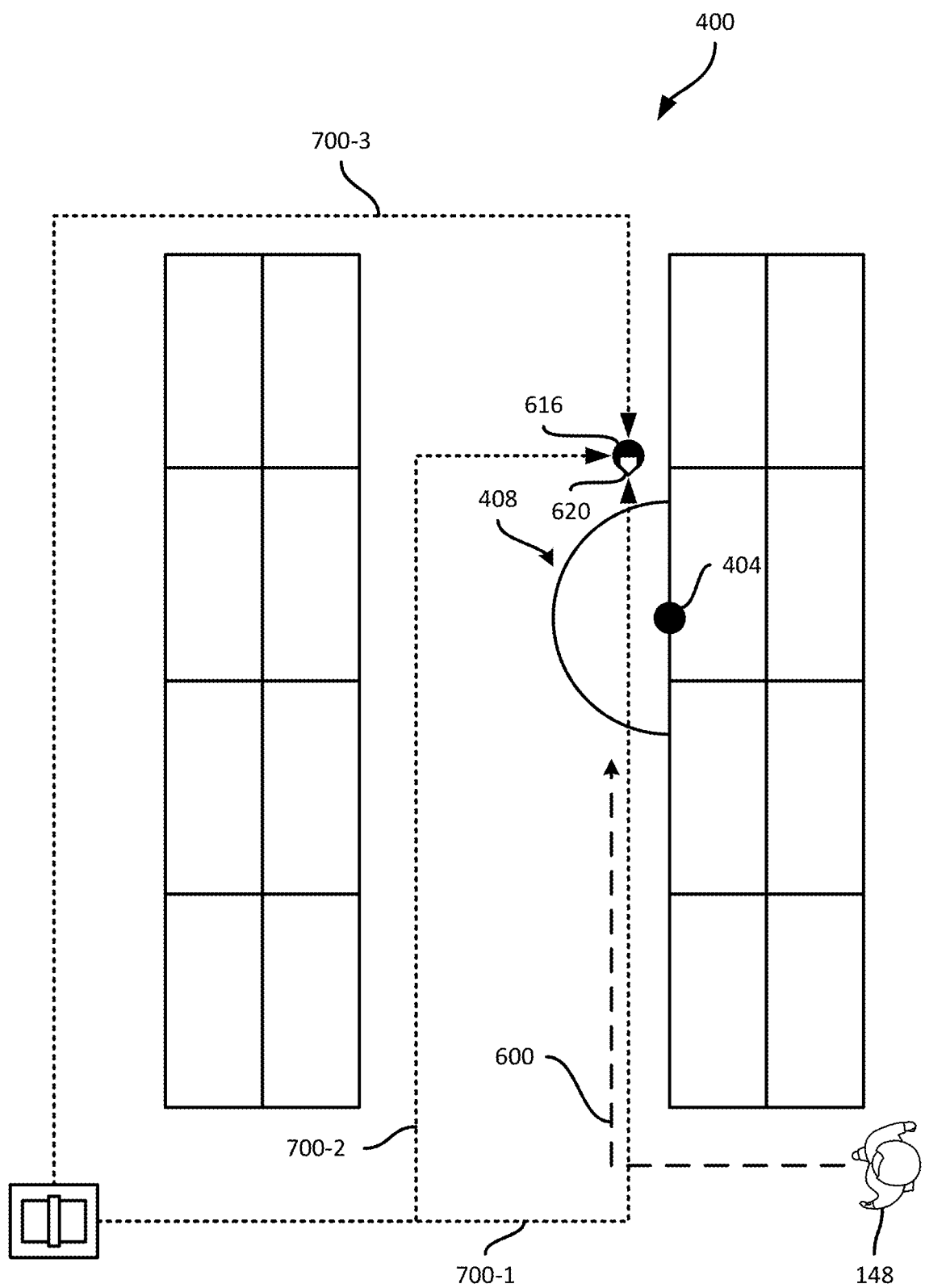
FIG. 7 is a schematic diagram of an example performance of block 325 of the method of FIG. 3.

For example, referring to FIG. 7, a schematic diagram of the map 400 including three potential robot paths, 700-1, 700-2, and 700-3, are depicted. For example, the server 128 may obtain the worker path 600 for the worker 148 to navigate to the task location 404 and consider the estimated time of arrival of the worker 148 based on the worker path 600.

The server 128 may consider the robot path 700-1 having the shortest length and the least number of turns to arrive at the stop position 616. If the worker 148 is estimated to arrive before the robot 120 or within a threshold buffer time after the robot 120 based on the robot path 700-1, then the server 128 may determine that the robot path 700-1 and the worker path 600 interfere with one another since portions of the robot path 700-1 and the worker path 600 are within a threshold distance of one another, and since the robot path 700-1 passes through the restricted region. If the worker 148 is estimated to arrive after the threshold buffer time after the estimated time of arrival of the robot 120, then the robot path 700-1 and the worker path 600 may be determined not to interfere with one another. That is, the robot 120 has sufficient time to arrive at the location prior to the worker 148 without obstructing the worker 148.

In other examples, rather than considering only the times of arrival of the robot 120 and the worker 148, the server 128 may additionally consider the speed at which the robot 120 and the worker 148 are expected to travel along the robot path 700-1 and the worker path 600, respectively. For example, after obtaining the worker path, the server 128 may time-sequence the worker path 600 to define a footprint which the worker 148 is expected to occupy at a given time. For example, the worker path 600 may be time-sequenced for predefined time intervals (e.g., 5 seconds, 10 seconds, etc.) to define regions in which the worker 148 is expected to be within the given intervals. The server 128 may additionally similarly time-sequence the robot path 700-1. If corresponding time-sequenced regions of the robot path 700-1 and the 600 do not interfere with one another (e.g., are non-overlapping), then the server 128 may determine that the robot path 700-1 as a whole does not interfere with the worker path 600.

If the most direct robot path 700-1 is determined to interfere with the worker path 600, then the server 128 may consider alternate robot paths, such as the robot paths 700-2 and 700-3. If the aisle 112 is sufficiently wide to accommodate both the robot 120 and the worker 148, the server 128 may elect the robot path 700-2, in which the robot path 700-2 is defined on an opposing side of the aisle 112 as the worker path 600. In some examples, the server 128 may be configured to define the robot path 700-2 irrespective of the estimated times of arrival of the robot 120 and the worker 148, since the robot path 700-2 does not interfere with (i.e., is at least a threshold distance away from) the worker path 600 at all.

In other examples, if the aisle 112 is not sufficiently wide to accommodate both the robot 120 and the worker 148, or to reduce likelihood of congestion (e.g., to allow robots and/or workers moving in the opposite direction to pass within the aisle 112), the server 128 may define the robot path 700-3 which traverses a different aisle 112 from the aisle 112 containing the task location. Since the robot path 700-3 does not overlap with (i.e., is not within a threshold distance of) the worker path 600, the robot path 700-3 may be determined to avoid interference with the worker path 600.

In addition to defining a path along which to navigate to reach the stop position 616, each robot path 700 may additionally define rotation to be executed at the stop position 616 to achieve the assigned stop orientation 620. For example, upon navigating the robot path 700-1, the forwards side of the robot 120 may be facing opposite the stop orientation 620, and hence may rotate by 180° to attain the correct stop orientation 620. Similarly, upon navigating the robot path 700-2, the forwards side of the robot 120 may be facing the support structure 104, and hence the robot 120 may rotate by 90° to attain the correct stop orientation 620. Upon navigating the robot path 700-3, the robot 120 is already oriented in the stop orientation 620, and hence no further rotation is performed.

Returning again to FIG. 3, after determining the robot path, at block 330, the server 128 directs the robot 120 to the stop pose for completion of the task. For example, the server 128 may send the robot path determined at block 325 to the robot 120 to navigate to the stop pose.

In some examples, after directing the robot 120 to the stop pose, the server 128 may monitor the navigation of the worker 148 to the task location. In particular, the worker 148 may use their agency to deviate from the worker path suggested or predicted by the server 128. In some examples, such deviations may cause the worker 148 to enter the aisle 112 of the task location from the opposite direction, and accordingly the worker access zone may change. Thus, in monitoring the position of the worker 148 during navigation to the task location, the server 128 may predict changes in the worker path based on positions and directions of movement of the worker 148. In response to detecting a deviation from the worker path, the server 128 may determine a new predicted worker path, and return to block 315 to identify a new worker access zone, and subsequently a new stop pose for the robot 120.

In other examples, the predicted or suggested worker path may be determined by the server 128 based on the tasks assigned to the worker 148, and hence the server 128 may disregard any deviations to the worker path. For example, the server 128 may determine that several tasks are located within the same aisle and may assign the tasks to the worker 148 to optimize the worker and robot paths to move from one end of the aisle to the other (i.e., exhibiting a "follow-me" relationship between the robot 120 and the worker 148) without doubling back.

Figure 8:
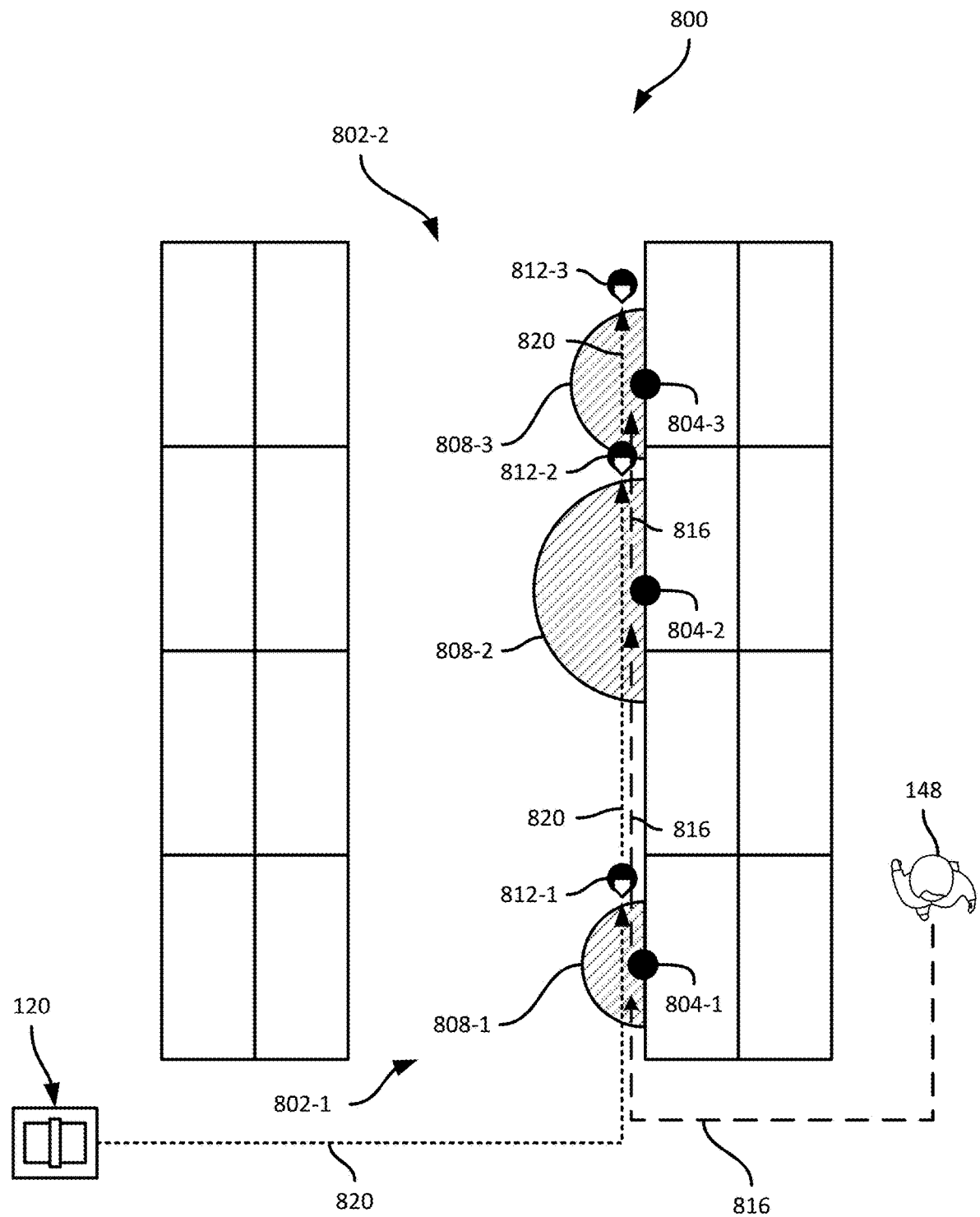
FIG. 8 is a schematic diagram of an example performance of iterations of the method of FIG. 3 to enable a "follow-me" correspondence.

For example, referring to FIG. 8, an example schematic diagram of several iterations of the method 300 to enable a "follow-me" correspondence is depicted. In particular, FIG. 8 illustrates a portion of a map 800 of the facility. The map 800 identifies three task locations 804-1, 804-2, and 804-3, each located along a single aisle having a first end 802-1 and a second end 802-2. Based on the locations of the worker 148 and the robot 120, the server 128 may assign the tasks in the order from task location 804-1, task location 804-2, task location 804-3 to allow the robot 120 and the worker 148 to move from the first end 802-1 to the second end 802-2.

Each of the task locations 804 may have a respective restricted region 808-1, 808-2, and 808-3 restricting the stop position of the robot 120 at each task location 804. Further, as can be seen, the restricted regions 808 may differ in size, for example based on the item 108 being picked at each task location 804. The server 128 may assign respective stop positions 812-1, 812-2, and 812-3 at each task location 804, which are each on the side of the corresponding restricted region 808 which is closer to the second end 802-2 of the aisle. Thus, as the robot 120 and the worker 148 progress from the first task location 804-1 to the second task location 804-2 and to the third task location 804-3, a "follow-me" relationship is exhibited, in which worker paths 816 and robot paths 820 between task locations 804 give rise to the worker 148 following the robot 120.

In some examples, if the worker 148 is estimated to arrive prior to the robot 120, the worker access zone may be defined to allow the worker 148 to access the task location and move towards the next task without being obstructed by the robot 120. That is, the stop positions 812 may be on each side of the corresponding restricted region 808 which is closer to the first end 802-1 of the aisle. Thus, as the robot 120 and the worker 148 progress from the first task location 804-1 to the second task location 804-2 and to the third task location 804-3, a "follow-me" relationship is exhibited, in which the worker paths and the robot paths give rise to the robot 120 following the worker 148.

Other manners of assigning tasks and related stop poses are also contemplated. For example, rather than determining the robot path at block 325 of the method 300, the server 128 may proceed directly to block 330 to direct the robot 120 to the stop pose. In such examples, the server 128 may send the stop pose, including the stop position and the stop orientation, to the robot 120. The robot 120 itself may then determine a suitable robot path to navigate to the specified stop pose, for example, via execution of the process described with respect to block 325. In other examples, some or all of the method 300 may be performed by the robot 120 and/or a distributed system, such as a mesh network formed from a plurality of the robots 120, or the like.

Figure 9:
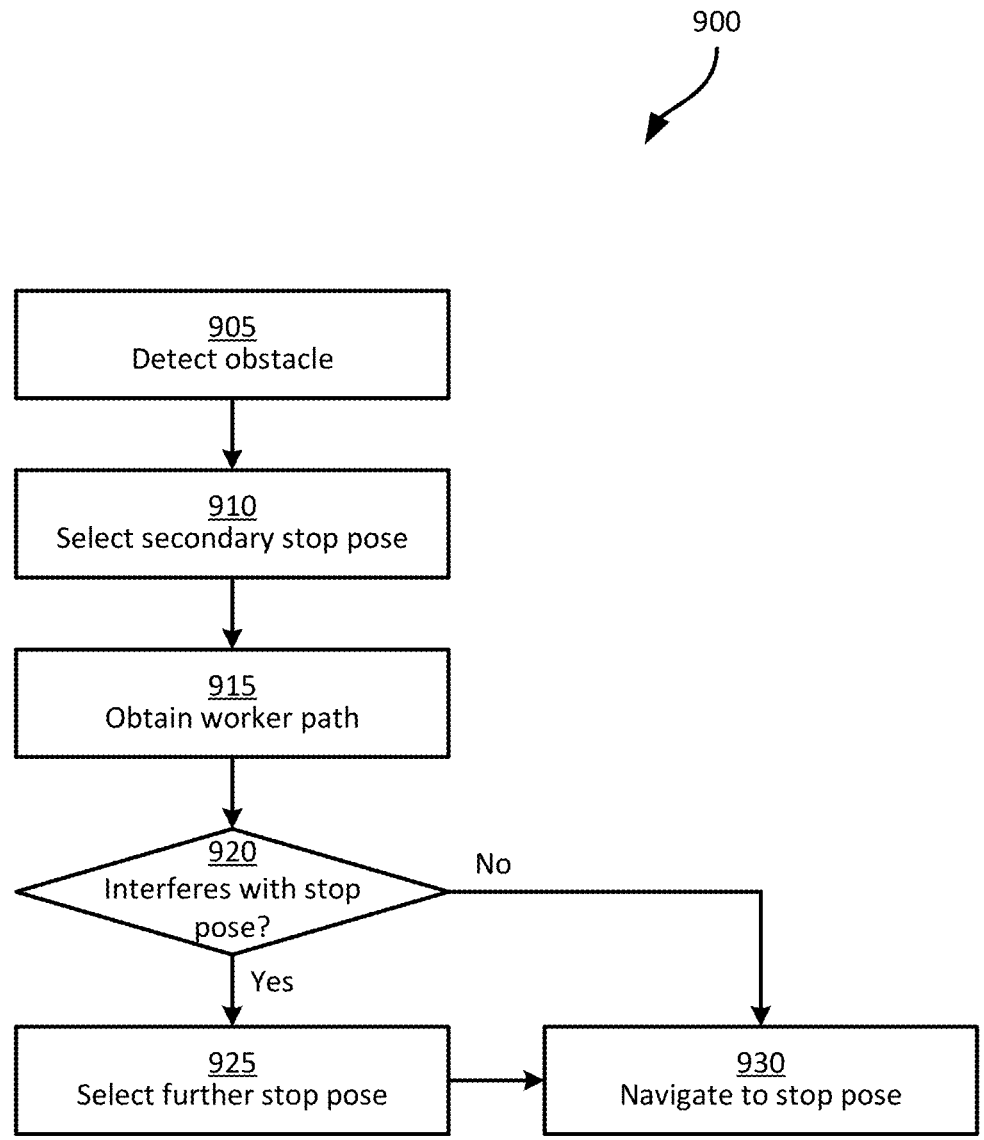
FIG. 9 is a flowchart of an example method for handling an obstacle.

Determination of the robot path by the robot 120 may additionally allow for obstacles and/or other navigational matters detected by sensors of the robot 120 to be considered. For example, referring to FIG. 9, an example method 900 of handling an obstacle is depicted. The method 900 is described below as being performed by the robot 120, however in other examples, may be performed by other suitable devices and/or systems, such as the server 128 in response to a request from the robot 120.

At block 905, the robot 120 detects an obstacle, in particular, which obstructs the specified stop position for the robot 120. The robot 120 may detect such an obstacle, for example using various sensors, including image sensors, depth sensors, and the like. The obstacle may be, for example, another robot, a worker, a pallet (e.g., containing items) or the like. In some examples, the robot 120 may monitor the obstacle for a predetermined amount of time to determine whether the obstacle is transient (e.g., a worker and/or a robot passing through the stop position while in transit) or permanent or semi-permanent (e.g., another robot waiting at the stop position for another task to be performed). If the obstacle is transient, the robot 120 may discard the classification of the detected object as an obstacle.

At block 910, the robot 120 may select a secondary stop pose. The secondary stop pose may include a secondary stop position, which may maintain the condition of being outside the restricted region. However, the secondary stop pose may relax other conditions, such as avoiding obstructing with the worker access zone. For example, the robot 120 may instead prioritize the alignment of the secondary stop position along the support structure 104 on which the task location is located to maintain passing space for other robots 120 and/or workers 148 in the aisle 112. The robot 120 may additionally determine a secondary stop orientation to orient the target item basket proximal to the task location.

In some examples, the robot 120 may also consider the worker path and estimated time of arrival in selecting a new stop pose. Accordingly, at block 915, the robot 120 may obtain the worker path for the worker 148 to navigate to the task location. The robot 120 may communicate directly with the device 152 associated with the worker 148, with the server 128 to obtain the worker path, or with other suitable devices in the facility to obtain the worker path.

At block 920, if the robot 120 determines that the worker path does not interfere with the secondary stop pose, then the robot 120 proceeds to block 930 to navigate to the secondary stop pose. For example, the determination at block 920 may simply be based on the estimated time of arrival of the worker 148 based on the worker path. That is, if the robot 120 is able to move to the secondary stop pose prior to the worker 148 arriving at the task location, the robot 120 may determine that the worker path does not interfere with the secondary stop pose. This may allow the robot 120 to prioritize maintaining passing space within the aisle 112.

If, at block 920, the robot 120 determines that the worker path interferes with the robot's ability to arrive at the secondary stop pose selected at block 910, then the robot 120 proceeds to block 925 to select a further stop pose for the robot 120. The further stop pose may include a further stop position and stop orientation. The further stop position continues to maintain the condition of being outside the restricted region, but may be located, for example on the opposite side of the aisle 112 in which the task location is located.

After selecting the further stop pose at block 925, the robot 120 proceeds to block 930 to navigate to the further stop pose. In some examples, the robot 120 may iteratively check for other obstacles, interferences, and the like which may impede the further stop pose and select further stop poses until a suitable stop pose is identified.

Figure 10:
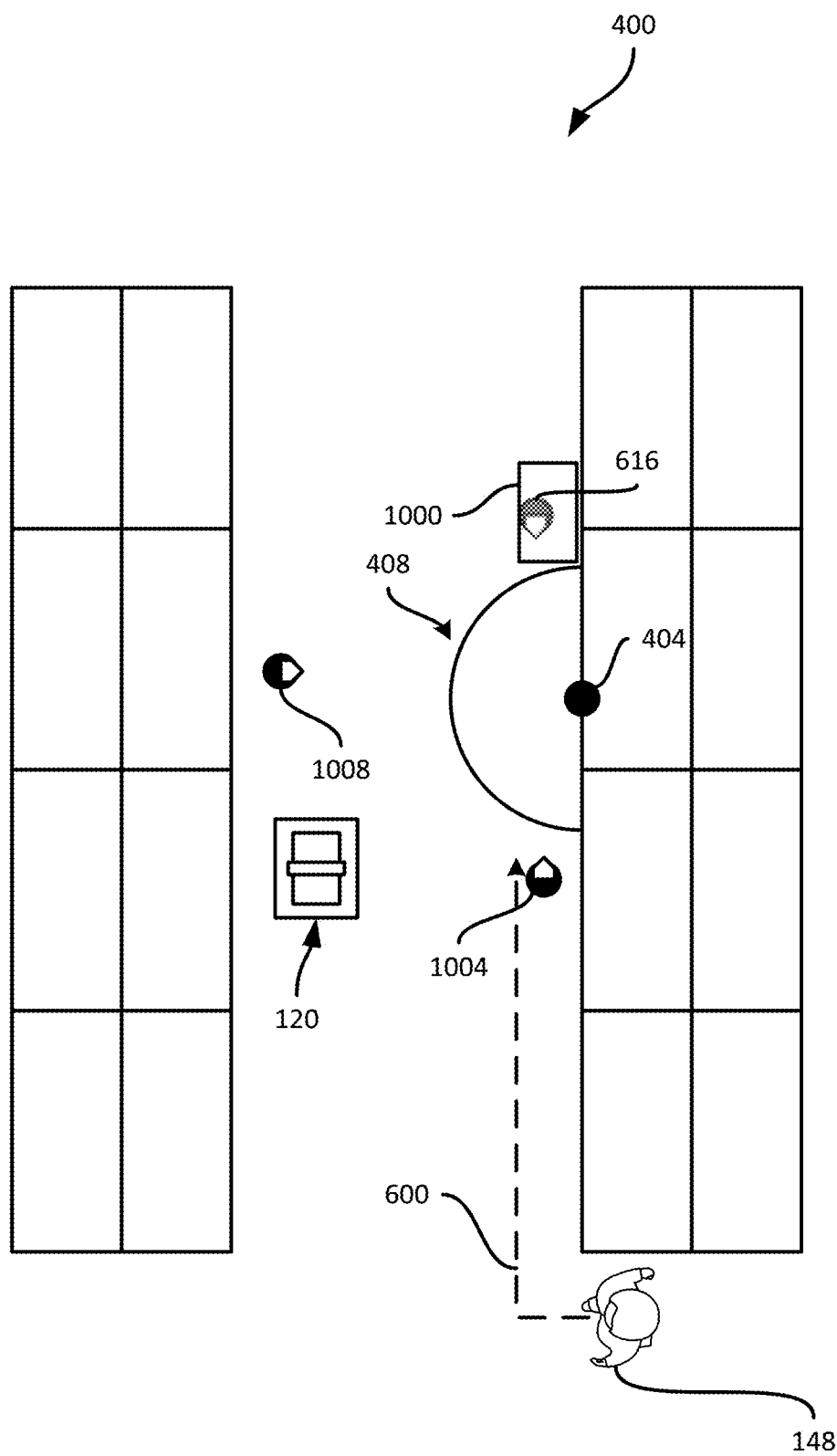
FIG. 10 is a schematic diagram of an example performance of the method of FIG. 9.

For example, referring to FIG. 10, a schematic diagram of a portion of the map 400 is depicted. In particular, after selection of the stop position 616 and navigation towards the stop position 616, the robot 120 may detect an obstacle 1000 at the stop position 616. Accordingly, the robot 120 may select a secondary stop position 1004 outside the restricted region and along the support structure of the task location 404.

The robot 120 may further reference the worker path 600 to determine if the robot 120 can navigate to the secondary stop position 1004 prior to the worker 148 arriving at the task location 404. If the robot 120 determines that it can navigate to the secondary stop position 1004 (i.e., that the worker path 600 does not interfere with the selected secondary stop position 1004), then the robot 120 navigates to the secondary stop position 1004. If the robot 120 determines that it cannot navigate to the secondary stop position 1004 prior to the worker 148 arriving at the task location 404 (i.e., that the worker path 600 does interfere with the selected secondary stop position 1004), then the robot selects a further stop position 1008 and navigates to the further stop position 1008.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, rather than directing an autonomous mobile robot, the method of coordination described herein may be applied to another vehicle or transporter, such as a fork lift truck, pallet truck, or other manned or unmanned vehicle to indicate a stop pose which is outside of a restricted region to not obstruct the location where a task is to be performed.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of coordinating a mobile robot with a worker to access a location of a task, the method comprising:
   obtaining the location of the task;
   identifying a restricted region around the task location, the restricted region representing an area in which the mobile robot is restricted from stopping;
   identifying a worker access zone relative to the restricted region for the worker to access the task location; and
   determining a stop pose of the mobile robot, wherein the stop pose includes a stop position outside the restricted region selected to avoid obstructing the worker access zone; and
   controlling navigation of the mobile robot according to the stop pose;
   wherein at least one of a size or a shape of the restricted region is defined based on one or more of: a size of an item at the task location and a width of an aisle of the task location.

2. The method of claim 1, wherein the restricted region comprises a region within a predefined radius of the task location.

3. The method of claim 1, further comprising:
obtaining a worker path for the worker to navigate to the task location; and
identifying the worker access zone based on the worker path.

4. The method of claim 3, wherein:
the worker access zone is located at a first side of the task location proximal to the worker path; and
the stop position is located at a second side of the task location distal from the worker path.

5. The method of claim 3, further comprising:
in response to detecting a deviation of the worker from the worker path:
obtaining a new worker path;
identifying a new worker access zone based on the new worker path; and
determining a new stop pose for the mobile robot based on the new worker access zone.

6. The method of claim 1, further comprising:
detecting, by the mobile robot, an obstacle at the stop position; and
determining a secondary stop pose including a secondary stop position outside the restricted region.

7. The method of claim 1, wherein the stop pose further includes a stop orientation for the mobile robot, the stop orientation selected to orient the mobile robot toward the worker access zone.

8. The method of claim 7, further comprising:
identifying one or more receptacles of the mobile robot as being available for the task; and
orienting the mobile robot so that the one or more receptacles are accessible by the worker from the worker access zone.

9. The method of claim 1, further comprising:
obtaining a worker path for the worker to navigate to the task location;
determining a robot path to the stop position, wherein the robot path is defined to avoid interference with the worker path.

10. The method of claim 9, wherein the robot path is determined to avoid interference with the worker path if one of:
(i) no portion of the robot path overlaps with the worker path;
(ii) an estimated worker time of arrival is after a threshold buffer time after an estimated robot time of arrival; or
(iii) time-sequenced regions of the robot path and the worker path do not overlap with one another.

11. The method of claim 1, further comprising directing the mobile robot to the stop pose for completion of the task.

12. A server for coordinating a mobile robot with a worker to access a task location to perform a task, the server comprising:
a memory and a communications interface;
a processor interconnected with the memory and the communications interface, the processor configured to:
obtain the location of the task for the mobile robot;
identify a restricted region around the task location, the restricted region representing an area in which the mobile robot is restricted from stopping;
identify a worker access zone relative to the restricted region for the worker to access the task location; and
determine a stop pose of the mobile robot, wherein the stop pose includes a stop position outside the restricted region selected to avoid obstructing the worker access zone; and
control navigation of the mobile robot according to the stop pose;
wherein at least one of a size or a shape of the restricted region is defined based on one or more of: a size of an item at the task location and a width of an aisle of the task location.

13. The server of claim 12, wherein the restricted region comprises a region within a predefined radius of the task location.

14. The server of claim 12, wherein the processor is further configured to:
obtain a worker path for the worker to navigate to the task location; and
identify the worker access zone based on the worker path.

15. The server of claim 14, wherein:
the worker access zone is located at a first side of the task location proximal to the worker path; and
the stop position is located at a second side of the task location distal from the worker path.

16. The server of claim 14, wherein the processor is further configured to:
in response to detecting a deviation of the worker from the worker path:
obtain a new worker path;
identify a new worker access zone based on the new worker path; and
determine a new stop pose for the mobile robot based on the new worker access zone.

17. The server of claim 12, wherein the processor is further configured to:
in response to detecting, by the mobile robot, an obstacle at the stop position: determine a secondary stop pose including a secondary stop position outside the restricted region.

18. The server of claim 12, wherein the stop pose further includes a stop orientation for the mobile robot, the stop orientation selected to orient the mobile robot toward the worker access zone.

19. The server of claim 18, wherein the processor is further configured to:
identify one or more receptacles of the mobile robot as being available for the task; and
orient the mobile robot so that the one or more receptacles are accessible by the worker from the worker access zone.

20. The server of claim 12, wherein the processor is further configured to:
obtain a worker path for the worker to navigate to the task location;
determine a robot path to the stop position, wherein the robot path is defined to avoid interference with the worker path.

21. A mobile robot comprising:
a chassis with a locomotive assembly;
a processor configured to:
obtain a location of a task;
identify a restricted region around the task location, the restricted region representing an area in which the mobile robot is restricted from stopping;
identify a worker access zone relative to the restricted region for the worker to access the task location; and determine a stop pose of the mobile robot, wherein the stop pose includes a stop position outside the restricted region selected to avoid obstructing the worker access zone:

wherein at least one of a size or a shape of the restricted region is defined based on one or more of: a size of an item at the task location and a width of an aisle of the task location.

22. The mobile robot of claim 21, wherein the processor is further configured to:
   obtain a worker path for the worker to navigate to the task location; and
   identify the worker access zone based on the worker path.

23. The mobile robot of claim 21, wherein:
   the worker access zone is located at a first side of the task location proximal to the worker path; and
   the stop position is located at a second side of the task location distal from the worker path.

24. The mobile robot of claim 21, wherein the processor is further configured to:
   in response to detecting, by the mobile robot, an obstacle at the stop position: determine a secondary stop pose including a secondary stop position outside the restricted region.

25. The mobile robot of claim 21, wherein the processor is further configured to:
   identify one or more receptacles of the mobile robot as being available for the task; and
   orient the mobile robot so that the one or more receptacles are accessible by the worker from the worker access zone.

* * * * *